UNITED STATES PATENT OFFICE.

FRUMENCE NICOLAS FREZON AND LOUIS RODRIGUEZ D'OLIVEIRA, OF PARIS, FRANCE.

IMPROVEMENT IN PROCESSES OF TREATING BEET-ROOTS FOR THE MANUFACTURE OF SUGAR.

Specification forming part of Letters Patent No. 207,271, dated August 20, 1878; application filed January 21, 1878; patented in France, September 12, 1872.

*To all whom it may concern:*

Be it known that we, FRUMENCE NICOLAS FREZON and LOUIS RODRIGUEZ D'OLIVEIRA, both of Paris, France, have invented an Improved Process of Making Sugar from Beet-Roots, of which the following is a specification:

This invention relates to certain improvements in the treatment of beet-roots for the manufacture of sugar.

Heretofore it has been customary to grate or slice the beet-roots after a preliminary washing to separate the dirt and earthy matters adherent thereto, and afterward to separate the juices from the mass of grated or sliced roots by lixiviation, maceration, or pressure. This method of preparation has been attended with serious difficulties, owing to the fact that there is a vegetable coloring matter in the beet-roots which discolors the resulting sugar, and is extremely difficult of removal from the juice as obtained from the lixiviating, macerating, or pressing process heretofore employed.

We have discovered that the coloring matter is contained mainly in the outer portions of the beet-root; and our invention has for its object to remove it from such portions, or to destroy it before they are subjected to pressure for the extraction of the juice; and to this end our invention consists in subjecting the beet-roots, in their whole state after the usual preliminary washing, to the action of a solution of oxychloride of calcium, commonly known as "chloride of lime" or "bleaching-powder."

In carrying out our invention, we take the beet-roots, and after washing the same as usual to separate the dirt, sand, and dust naturally adhering thereto, and after separating the tops, we subject them, without previous slicing or grinding, to the action of a boiling solution of oxychloride of calcium or bleaching-powder, the strength of said solution and the time of treatment depending upon the season at which the operation is conducted and the age of the beet-roots. For instance, in the early part of the season, when the beet-roots are young and comparatively devoid of coloring matter, they may be subjected for about one hour to a boiling solution of the bleaching-powder of a strength of five-tenths of a degree Baumé, and as the season advances the time may be gradually increased to one hour and a half, and the strength of the solution to about one and a half degree Baumé. After being subjected to the solution above described, the beet-roots are separated from the solution and washed, and are then subjected to pressure for the extraction of the juice, which will be found clear and free from coloring matter.

The waste solution used in the bleaching operation, being rich in nitrogenous matters, may be employed with advantage as a manure, and the pulpy residue left after subjecting the roots to pressure forms a valuable fodder for animals, as it contains the greater portion of the mucilaginous matters of the beet-root. The expressed juice is then boiled with ammonia, in the proportion of two thousand two hundred and five pounds avoirdupois of the ammonia to ten hectoliters, or two hundred and twenty gallons of the juice, at 5 degrees Baumé, the boiling lasting from eight to ten minutes at the beginning of the season to about thirty minutes as the season approaches its end.

The juice is then decanted from any deposition which may take place, and subjected again to the action of fresh ammonia and decantation, and this is continued until it is sufficiently pure for evaporation and crystallization in the ordinary manner.

The essential feature of our invention consists in the treatment of the beet-roots in a whole or unbroken condition to the action of a bleaching agent; and although we prefer the oxymuriate of calcium for the purpose, other agents which will accomplish the same effect may be employed, such as the chlorides of baryta, strontia, manganese, magnesia, ammonia, alumina, or iron.

What we claim is—

The process of preparing beet-roots for the manufacture of sugar, by treating them in a whole state to the action of boiling water and a bleaching agent, such as oxychloride of calcium, substantially as and for the purposes specified.

FRUMENCE NICOLAS FREZON.
  LOUIS RODRIGUEZ D'OLIVEIRA.

Witnesses:
  HENRY ROBERT LE COCQ,
  T. HÉBRI.